(12) United States Patent
Takushima et al.

(10) Patent No.: US 12,246,382 B2
(45) Date of Patent: Mar. 11, 2025

(54) ADDITIVE MANUFACTURING APPARATUS

(71) Applicant: Mitsubishi Electric Corporation, Tokyo (JP)

(72) Inventors: Shigeru Takushima, Tokyo (JP); Hiroyuki Kawano, Tokyo (JP); Yoshitsugu Sawa, Tokyo (JP); Daiji Morita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 814 days.

(21) Appl. No.: 17/285,910

(22) PCT Filed: Nov. 9, 2018

(86) PCT No.: PCT/JP2018/041751
§ 371 (c)(1),
(2) Date: Apr. 16, 2021

(87) PCT Pub. No.: WO2020/095454
PCT Pub. Date: May 14, 2020

(65) Prior Publication Data
US 2021/0370409 A1    Dec. 2, 2021

(51) Int. Cl.
*B22F 12/90* (2021.01)
*B22F 12/57* (2021.01)
(Continued)

(52) U.S. Cl.
CPC .............. *B22F 12/90* (2021.01); *B22F 12/57* (2021.01); *B23K 26/032* (2013.01); *B33Y 30/00* (2014.12)

(58) Field of Classification Search
CPC ...... B23K 26/032; B33Y 30/00; B33Y 50/02; B22F 12/90; B22F 12/57; B22F 12/30; B22F 10/36
(Continued)

(56) References Cited

U.S. PATENT DOCUMENTS

| 6,072,899 A * | 6/2000 | Irie | G06F 18/00 |
| | | | 348/125 |
| 6,600,129 B2 * | 7/2003 | Shen | B29C 64/153 |
| | | | 219/121.61 |

(Continued)

FOREIGN PATENT DOCUMENTS

| CN | 104807410 A | 7/2015 |
| CN | 108723583 A | 11/2018 |

(Continued)

OTHER PUBLICATIONS

Office Action issued on Aug. 22, 2023, in corresponding Chinese patent Application No. 201880099220.0, 17 pages.

(Continued)

*Primary Examiner* — Jessee R Roe
*Assistant Examiner* — Michael Aboagye
(74) *Attorney, Agent, or Firm* — XSENSUS LLP

(57) ABSTRACT

An additive manufacturing apparatus is an additive manufacturing apparatus that performs an additive manufacturing process by depositing a molten fabrication material at a working position while moving the working position on a workpiece, and forms a manufactured product by repeating the additive manufacturing process. The apparatus includes a height measurement unit that outputs a measurement result representing the height of the manufactured product having already been formed on the workpiece at a measurement position, and a control unit that controls a machining condition to be used when new deposition is made at the measurement position, in accordance with the measurement result.

21 Claims, 9 Drawing Sheets

(51) Int. Cl.
*B23K 26/03* (2006.01)
*B33Y 30/00* (2015.01)

(58) Field of Classification Search
USPC .......................................................... 266/78
See application file for complete search history.

(56) References Cited

U.S. PATENT DOCUMENTS

| | | | |
|---|---|---|---|
| 10,005,229 B2* | 6/2018 | Mantell | H04N 1/02805 |
| 10,456,983 B2 | 10/2019 | Niitani | |
| 10,502,555 B2 | 12/2019 | Nakamura et al. | |
| 10,751,946 B2* | 8/2020 | Sanz Ananos | B33Y 50/00 |
| 2016/0311059 A1* | 10/2016 | Obara | B23K 26/1462 |
| 2017/0252970 A1 | 9/2017 | Tsunoya et al. | |
| 2018/0133840 A1 | 5/2018 | Noriyama et al. | |
| 2018/0299260 A1 | 10/2018 | Nakamura et al. | |
| 2019/0039323 A1 | 2/2019 | Nitani | |
| 2019/0047229 A1 | 2/2019 | Niitani | |
| 2022/0297192 A1* | 9/2022 | Takushima | B22F 12/42 |

FOREIGN PATENT DOCUMENTS

| | | |
|---|---|---|
| DE | 10 2009 017 900 A1 † | 10/2010 |
| EP | 2 886 239 A1 † | 6/2015 |
| JP | 9-225666 A | 9/1997 |
| JP | 2000-167678 A | 6/2000 |
| JP | 2009-83326 A | 4/2009 |
| JP | 2015-174420 A | 10/2015 |
| JP | 2016-112607 A | 6/2016 |
| JP | 2017-160471 A | 9/2017 |
| WO | 2009/041707 A2 | 4/2009 |
| WO | 2017/163430 A1 | 9/2017 |
| WO | 2017/163432 A1 | 9/2017 |
| WO | 2018/178387 A1 † | 10/2018 |

OTHER PUBLICATIONS

International Search Report and Written Opinion mailed on Dec. 11, 2018, received for PCT Application PCT/JP2018/041751, Filed on Nov. 9, 2018, 8 pages including English Translation.
Chinese Office Action issued Jul. 29, 2022, in Chinese Application No. 201880099220.0.
Chinese Office Action issued Jan. 28, 2023 in corresponding Chinese Patent Application No. 201880099220.0 (with English translation), 17 pages.
German Office Action issued Aug. 3, 2021 in German Application No. 11 2018 008 046.3.
Chinese Office Action issued May 26, 2023 in corresponding Chinese Patent Application No. 201880099220.0 (with 1 machine-generated English translation), 22 pages.
Office Action issued Apr. 4, 2024 in German Patent Application No. 112018008046 with English translation thereof, 10 pages.

* cited by examiner
† cited by third party (a)   (b)

ADDITIVE MANUFACTURING APPARATUS

CROSS-REFERENCE TO RELATED APPLICATION

The present application is based on PCT filing PCT/JP2018/041751, filed Nov. 9, 2018, the entire contents of which are incorporated herein by reference.

FIELD

The present invention relates to an additive manufacturing apparatus for forming a manufactured product by melting and depositing a fabrication material at a working position.

BACKGROUND

An additive manufacturing apparatus is conventionally known that forms a three-dimensional manufactured product by depositing a fabrication material as in a 3D printer. Patent Literature 1 discloses a layered object manufacturing device that adopts a directed energy deposition (DED) method as a method for depositing a metal substance as a fabrication material. The layered object manufacturing apparatus using a directed energy deposition method described in Patent Literature 1 supplies a metal material such as a metal wire or a metal powder as the fabrication material from a supply port to a base for forming a product, and melts and deposits the metal material by means of laser light or an electron beam to form a product. The layered object manufacturing device described in Patent Literature 1 is also capable of moving the supply port in three axial directions, i.e., an X-direction, a Y-direction, and a Z-direction perpendicular to both the X-direction and the Y-direction.

CITATION LIST

Patent Literature

Patent Literature 1: Japanese Patent Application Laid-open No. 2015-174420

SUMMARY

Technical Problem

However, the layered object manufacturing device described in Patent Literature 1 moves the supply port along a predetermined path. This may cause a formed product not to have a designed form. Specifically, the layered object manufacturing device described in Patent Literature 1 fails to uniformly deposit the metal material when the distance between the top surface of the base and the supply port is out of an appropriate value range. For example, in a case in which the distance between the top surface of the base and the supply port for metal material is greater than an appropriate value range, and the metal material is provided from such a supply port, in other words, in a case in which the height of the product is less than the design value, the metal material supplied becomes a molten droplet, which in turn causes surface irregularities on the product. On the contrary, in a case in which the distance between the top surface of the base and the metal material supply port is less than the appropriate value range, and the metal material is supplied from such a supply port, in other words, in a case in which the height of the product is greater than the design value, the metal material is excessively pressed on the product, which has an effect of producing some unmelted portion. Thus, the conventional additive manufacturing technique may fail to form a product as designed, and may thus result in reduced accuracy in forming a product.

The present invention has been made in view of the foregoing circumstances, and it is an object of the present invention to provide an additive manufacturing apparatus that prevents a reduction in accuracy in forming a product.

Solution to Problem

In order to the above-mentioned problem and achieve the object, the present invention provides an additive manufacturing apparatus that performs an additive manufacturing process by depositing a molten fabrication material at a working position while moving the working position on a workpiece, and forms a manufactured product by repeating the additive manufacturing process, the additive manufacturing apparatus comprising: a height measurement unit to output a measurement result representing a height of the manufactured product having already been formed on the workpiece, at a measurement position; and a control unit to control a machining condition to be used when new deposition is made at the measurement position, in accordance with the measurement result.

Advantageous Effects of Invention

The present invention exerts an advantageous effect in that an additive manufacturing apparatus can be provided to prevents a reduction in accuracy in forming a product.

DESCRIPTION OF EMBODIMENTS

An additive manufacturing apparatus according to embodiments of the present invention will be described in detail below with reference to the drawings. Note that these embodiments are not necessarily intended to limit this invention.

First Embodiment

Figure 1:
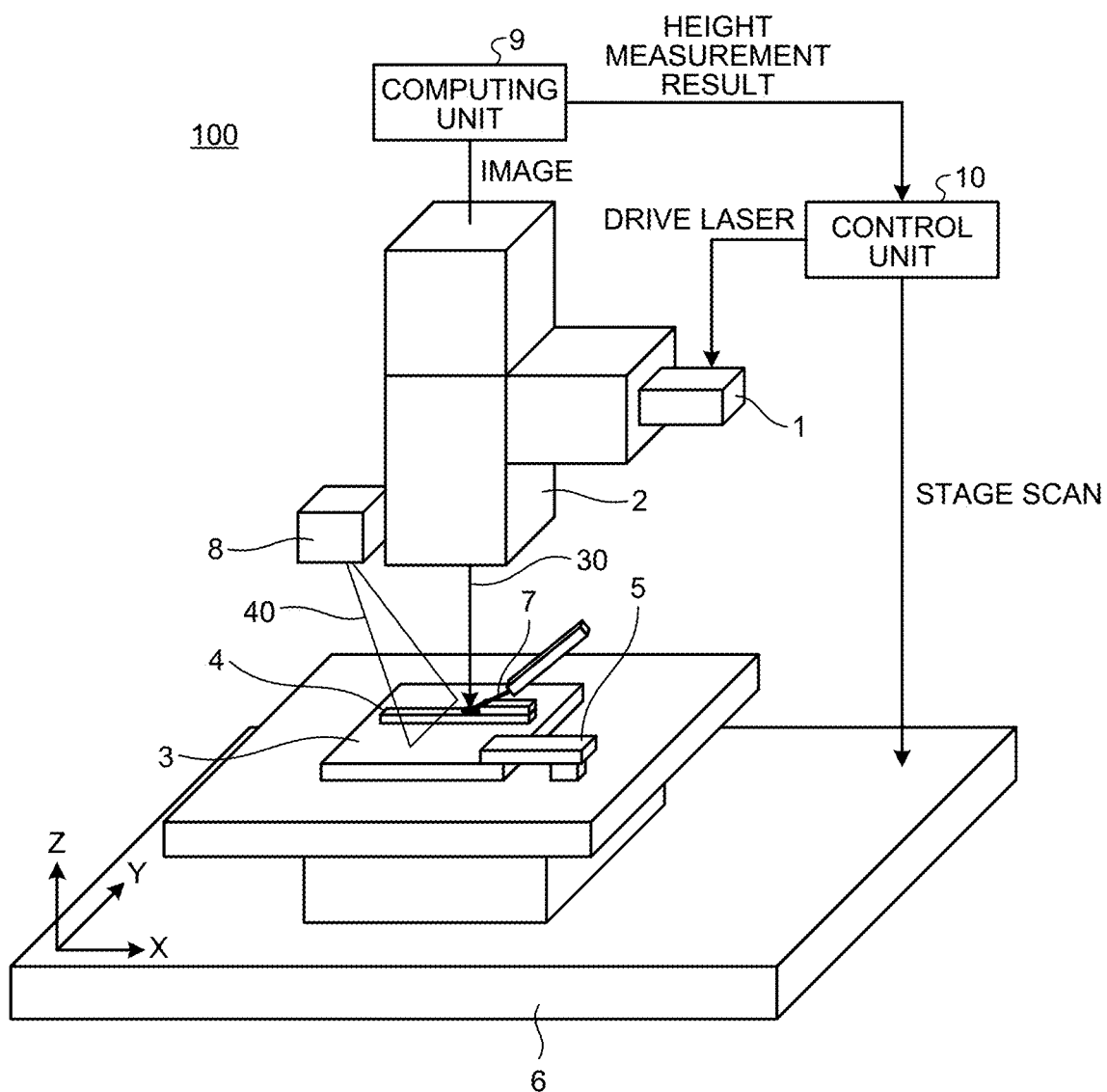
FIG. 1 is a perspective view illustrating a configuration of an additive manufacturing apparatus according to a first embodiment.

FIG. 1 is a perspective view illustrating a construction of an additive manufacturing apparatus 100 according to a first embodiment. Note that in this embodiment and the subsequent embodiment as well, description is based on the assumption that the additive manufacturing apparatus 100 is a metal deposition apparatus using a metal substance as the fabrication material, but the additive manufacturing apparatus 100 may be a type that uses another fabrication material such as a resin. In addition, a product formed by the additive manufacturing apparatus 100 may also be referred to as a layered product. Moreover, the following description assumes that the additive manufacturing apparatus 100 melts the fabrication material using a laser for machining to perform lamination processing, but other processing method such as arc discharge may also be used for the alternative for the apparatus 100. The additive manufacturing apparatus 100 of the present embodiment includes a machining laser 1, a machining head 2, a fixture 5, a driven stage 6, a line lighting device 8, a computing unit 9, and a control unit 10.

The machining laser 1 is a light source that emits machining light 30 for use in forming processing of forming a product 4 on a workpiece 3. As the machining laser 1, a fiber laser using a semiconductor laser, or a $CO_2$ laser is used. The machining light 30 emitted by the machining laser 1 has a wavelength of, for example, 1070 nm. The machining head 2 includes a machining optical system and a light receiving optical system. The machining optical system focuses the machining light 30 emitted from the machining laser 1 onto a working position on the workpiece 3. The light receiving optical system is configured to measure the height of the product 4 formed on the workpiece 3. The light receiving optical system is also referred to as a measurement optical system or height sensor. In general, since the machining light 30 is focused onto the working position in shape of a dot, a working position is referred to hereinafter as a working point. The machining laser 1 and the machining optical system constitute a machining unit. Note that in this embodiment and the subsequent embodiment as well, description is given in the context of a line section method using an optical system used as a height measurement method, but another measurement method, for example, an optical method may also be used thereas. Examples of the optical method include a spot-type triangulation method and a confocal method. A height measurement method other than an optical method may also be used. In addition, in the present embodiment, the light receiving optical system is placed in the machining head 2 to integrate the height sensor with the machining head 2. The additive manufacturing apparatus 100 may use another integration method as long as the height sensor is integrated with the work head 2. For the purpose of size reduction of the additive manufacturing apparatus 100, the machining head 2 desirably incorporates the light receiving optical system configured to make height measurement to integrate together the machining optical system and the light receiving optical system.

The workpiece 3 is placed on the driven stage 6, and is fixed on the driven stage 6 by means of the fixture 5. The workpiece 3 is a base for forming the product 4. The workpiece 3 is herein assumed to be a base plate, but may also be an object having a three-dimensional shape. Driving the driven stage 6 causes a change in the position of the workpiece 3 relative to the machining head 2, thereby causing the working point to move on the workpiece 3. That is, possible working points are scanned over the workpiece 3. The phrase "working points are scanned" means that a working point moves along a determined path, that is, to draw a determined trajectory. The additive manufacturing apparatus 100 performs an additive manufacturing process by depositing a molten fabrication material 7 at the working point that is a working position, while moving the working point on the workpiece 3. In other words, the additive manufacturing apparatus 100 deposits the molten fabrication material 7 at the working point moving on the workpiece 3 thereby to perform the additive manufacturing process. More specifically, the additive manufacturing apparatus 100 drives the driven stage 6 to move candidate points for the working positions on the workpiece 3. At least one of the candidate points on the travel path becomes a working point at which the fabrication material 7 is deposited.

The additive manufacturing apparatus 100 melts, at the working point, the fabrication material 7 supplied for performing the additive manufacture, by means of the machining light 30. The additive manufacturing apparatus 100 repeats scanning of the working points to stack a bead produced by solidification of the molten fabrication material 7, and so as to form the product 4 on the workpiece 3. That is, the additive manufacturing apparatus 100 repeats an additive manufacturing process to produce the product 4. In the initial additive manufacturing process, the additive manufacturing apparatus 100 deposits the molten fabrication material 7 on the workpiece 3. After repetitions of the additive manufacturing process, the additive manufacturing apparatus 100 deposits the molten fabrication material 7 on the product 4 having already been formed at a start time of the manufacturing process. The driven stage 6 can be subjected to scanning in three axes of X, Y, and Z. That is, the driven stage 6 can be translated in a direction along any one of the X, Y, and Z axes. For the driven stage 6, there is often caused a 5-axis stage that is rotatable also in the X-Y plane and in the Y-Z plane. In this situation, the driven stage 6 is assumed to be scanned along five axes, but the machining head 2 may be used for the scanning.

The line lighting device 8 applies a line beam 40 that is linear illumination light for measurement, to a measurement position on the workpiece 3 in order to measure the height of the product 4 having already been formed until the time of measurement. The measurement position is a position different from the working point. The line beam 40 reflects at the measurement position. The light receiving optical system is set in the machining head 2 to enable the light reflected at the measurement position to be received thereat.

Further, the light receiving optical system is situated to have an optical axis being tilted with respect to the optical axis of the line beam 40. Because a peak wavelength of thermal radiation light generated during manufacture is in an infrared range, it is desirable to use, for a light source of the line lighting device 8, a green laser of a wavelength of about 550 nm or a blue laser of a wavelength of about 420 nm which is distanced from the peak wavelength of the thermal radiation light. Note that the illumination light for use in measurement of the height of the product 4 does not necessarily need to be the line beam 40, but may also be a spot beam that is illumination light condensed in a dot shape. Use of a spot beam enables the height of a portion at the illuminated point on the workpiece 3. Meanwhile, use of the line beam 40 enables a height distribution over the illuminated range on the workpiece 3 to be measured. The present embodiment assumes that the line beam 40 is used for measurement of the height of the product 4.

The computing unit 9 computes the height of the product 4 at the point irradiated with the line beam 40 based on a position in which the light receiving optical system receives the reflected light of the line beam 40 on the principle of triangulation. The height of the product 4 corresponds to a position of the top surface of the product 4 in the Z-direction. In addition, the control unit 10 controls machining conditions for the additive manufacturing process using the height computed by the computing unit 9. More specifically, the control unit 10 optimizes, using the height computed by the computing unit 9, machining conditions such as a condition for driving the machining laser 1, a condition for driving the driven stage 6, and a condition for driving a wire supply unit that supplies a metal wire to be used as the fabrication material 7. The condition for driving the wire supply unit includes the height at which the metal wire is to be supplied. The line lighting device 8 serves as a lighting device for measurement. In addition, the line lighting device 8 and the light receiving optical system constitute a height sensor. Moreover, the height sensor and the computing unit 9 constitute a height measurement unit. That is, the height measurement unit measures the height of the product 4 having been fabricated on the workpiece at a measurement position 3.

The computing unit 9 and the control unit 10 according to the embodiment are implemented in a processing circuitry that is an electronic circuit that performs different processes.

Figure 2:
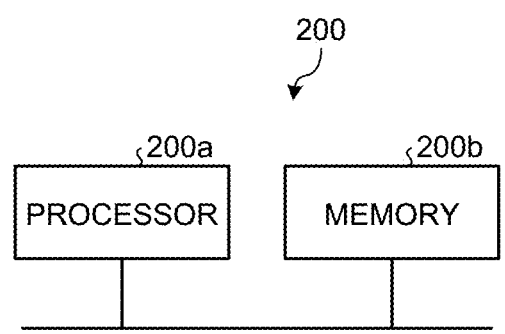
FIG. 2 is a diagram illustrating a control circuit according to the first embodiment.

This processing circuitry may be dedicated hardware, or a control circuit including a memory and a central processing unit (CPU) that executes a program stored in the memory. In this regard, the memory corresponds, for example, to: a non-volatile or volatile semiconductor memory such as a random access memory (RAM), a read-only memory (ROM), or a flash memory; a magnetic disk; an optical disk; or the like. FIG. 2 is a diagram illustrating a control circuit according to the first embodiment. In a case in which the processing circuitry is a control circuit including a CPU, this control circuit is, for example, a control circuit 200 configured as illustrated in FIG. 2.

As illustrated in FIG. 2, the control circuit 200 includes a processor 200a, which is the CPU, and a memory 200b. In the case of implementation based on the control circuit 200 illustrated in FIG. 2, a functionality is implemented by the processor 200a reading and executing a program corresponding to different processes, stored in the memory 200b. The memory 200b is also used as a temporary memory in the processes performed by the processor 200a.

Figure 3:
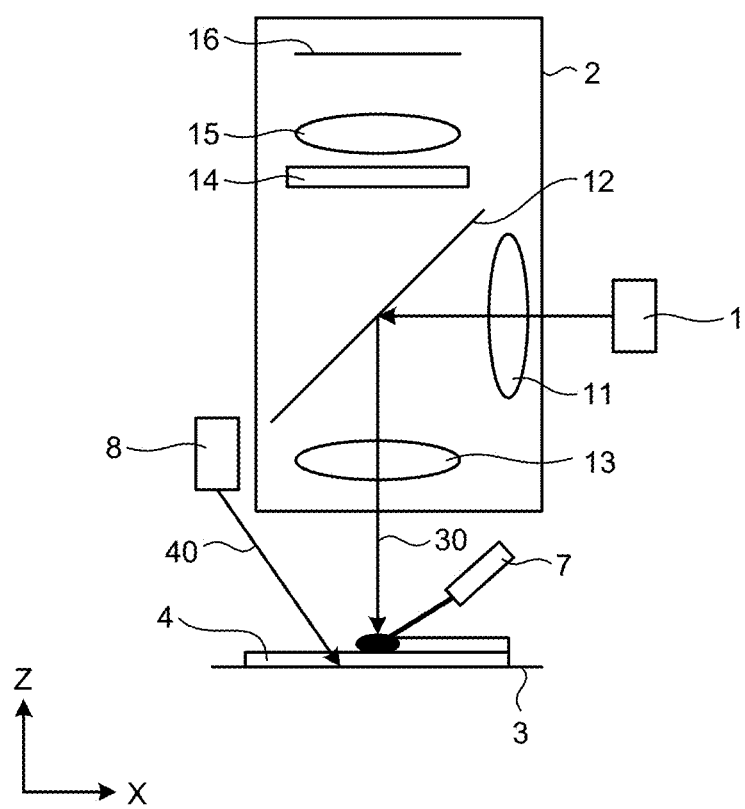
FIG. 3 is a diagram illustrating a cross section in an X-Z plane of the additive manufacturing apparatus according to the first embodiment.

FIG. 3 is a diagram illustrating a cross section in the X-Z plane of the additive manufacturing apparatus 100 according to the first embodiment. The machining head 2 includes a floodlight lens 11, a beam splitter 12, an objective lens 13, a band-pass filter 14, a condenser lens 15, and a light receiving unit 16. The machining light 30 emitted from the machining laser 1 passes through the floodlight lens 11, and is reflected by the beam splitter 12 toward the workpiece 3 and condensed by the objective lens 13 onto the working point on the workpiece 3. The floodlight lens 11, the beam splitter 12, and the objective lens 13 constitute the machining optical system included in the machining head 2. For example, the floodlight lens 11 has a focal length of 200 mm, and the objective lens 13 has a focal length of 460 mm. The surface of the beam splitter 12 is coated with a coating that increases the reflectance at the wavelength of the machining light 30 applied from the machining laser 1, and allows transmission of light having wavelengths shorter than the wavelength of the machining light 30. In addition, the additive manufacturing apparatus 100 supplies a metal wire or a metal powder to the working point as the fabrication material 7 while driving the driven stage 6 to realize scanning of the workpiece 3 in the positive X-direction. This causes the fabrication material 7 to be melted at the working point by the machining light 30 each time the working point is scanned, and the melted material to solidify, thereby generating a bead such that the bead extends in the negative X-direction. In this regard, the positive X-direction is, for example, the direction in which the X-axis illustrated in FIG. 1 extends along its arrow. This generated bead forms a part of the product 4. A new part of the product 4 is formed by deposition of a new bead on a part of the workpiece 3 serving as a base of the product 4 having already been formed, each time the working point is scanned. Repetition of this operation causes the fabrication material 7 to be deposited, thereby the product 4 that is the final product being formed.

The present embodiment will be described on the assumption that a metal wire is used as the fabrication material 7. In addition, the present embodiment will be described in the context of the condition of a machining direction for forming in which the workpiece 3 is scanned in the positive X-direction and the bead extends in the negative X-direction, that is, in the direction opposite to the direction of supply of the fabrication material 7. However, manufacture may be performed to cause the bead to extend in the positive X-direction, that is, the same direction as the direction of supply of the fabrication material 7 while scanning the workpiece 3 in the negative X-direction by driving the driven stage 6. Note that in this embodiment and the subsequent embodiment as well, description is given in the context of the bead being formed to extend linearly, but another bead formation method may also be used, in which beads formed in shape of a dot are joined together to form a single bead.

The line lighting device 8 for use in height measurement is attached on a side face of the work head 2, and emits the line beam 40 toward a measurement position on the workpiece 3 or on the product 4 having already been formed. The measurement position is determined in consideration of the direction of supply of the fabrication material 7 and the like. For example, use of a measurement position on the side opposite to the direction of supply of the fabrication material 7 with respect to the working point facilitates illumination of the measurement position without being blocked by the fabrication material 7. The line beam 40 is formed using a cylindrical lens or the like to form a beam perpendicular to the bead-formed direction and spreading along a direction (the Y-direction) parallel with the top surface of the driven stage 6. Thus, the line beam 40 is applied in form of a line to the product 4 having already been formed. The line beam 40 applied to the measurement position is reflected at the measurement position, enters the objective lens 13, is transmitted through the beam splitter 12 and the band-pass filter 14, and is focused onto the light receiving unit 16 by the condenser lens 15.

The objective lens 13 and the condenser lens 15 are collectively referred to as a light receiving optical system. The light receiving optical system is constituted by, for example, two lenses, i.e., the objective lens 13 and the condenser lens 15. The light receiving optical system, however, may also be constituted by three or more lenses in which, for example, the part for the condenser lens 15 has a two-lens configuration of a convex lens and a concave lens, as long as the light receiving optical system has a functionality of focusing the light onto the light receiving unit 16. What is used for the light receiving unit 16 is an area camera or the like, the area camera being equipped with a light receiving element such as a complementary metal-oxide semiconductor (CMOS) image sensor, but the configuration of the unit 16 is sufficient to include a light receiving element having a two-dimensional arrangement of pixels. Note that the band-pass filter 14 that allows only light of irradiation wavelength of the line beam 40 to be transmitted therethrough is desirably put in an optical system ranging from the beam splitter 12 to the light receiving unit 16. Providing the band-pass filter 14 enables removal of light of unwanted wavelengths, of machining light, thermal radiation light, ambient light, and the like.

Figure 4:
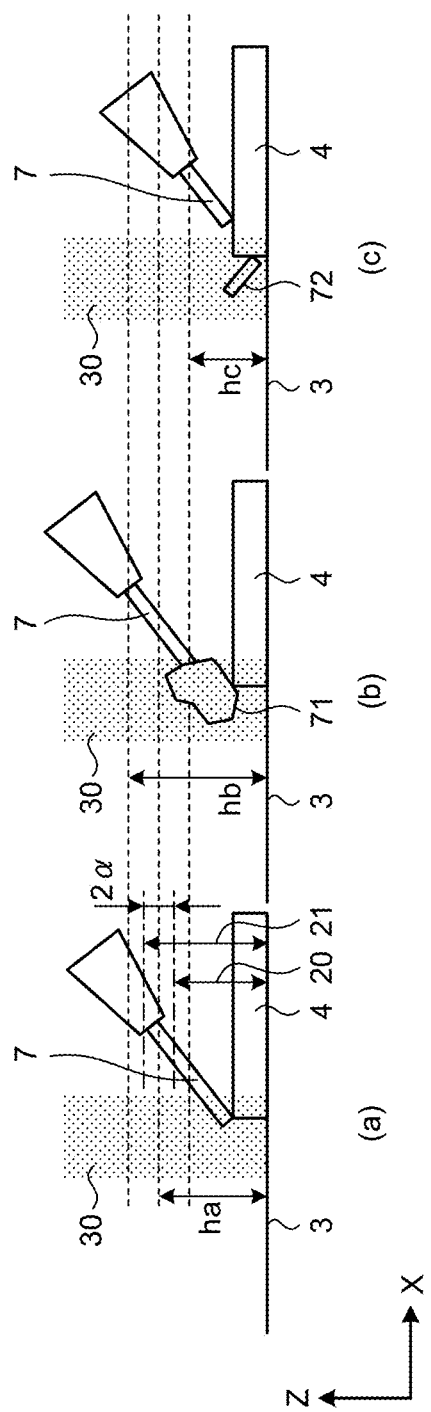
FIG. 4 is a diagram illustrating the height of a supply port for metal wire relative to the product according to the first embodiment.

The additive manufacturing apparatus 100 performs additive manufacture processes of supplying a metal wire as the fabrication material 7 to the working point, and applying the machining light 30 to the working point, thereby depositing a new layer on the product 4 having already been formed to produce a renewed product 4. FIG. 4 is a diagram illustrating the height of the supply port for the metal wire relative to the product 4 according to the first embodiment. In this regard, the height of the supply port for the metal wire refers to the height of the supply port for the metal wire with respect to the top surface of the workpiece 3. The height of the supply port for the metal wire may be hereinafter referred to simply as the height of the supply port. Note that setting of the amount of extrusion of the metal wire from the supply port to a known value enables the height of the leading end of the metal wire to be computed based on the height of the supply port. The amount of extrusion of the metal wire from the supply port represents a length from the supply port to the leading end of the metal wire. Control of the height of the supply port enables the height of the leading end of the metal wire to be controlled. It is assumed here that the amount of extrusion of the metal wire from the supply port is controlled to be maintained at a constant value, and that the height of the supply port and the height of the leading end of the metal wire are in a one-to-one correspondence. In addition, a suitable height range of the height of the supply port depends on the height of the product 4 already formed. As illustrated in FIG. 4, failure in supplying the metal wire with a suitable height dependent on the product 4 having already been formed causes an unfavorable machined result. For example, assume that ha±α denotes the suitable height range of the supply port dependent on the product 4 having already been formed illustrated in FIG. 4. In (a) of FIG. 4, the height of the supply port is at the center of the range of ha±α. In other words, in (a) of FIG. 4, the height of the supply port is ha. In (a) of FIG. 4, ha+α is represented as an upper limit value 21. In (a) of FIG. 4, ha−α is represented as a lower limit value 20. In (a) of FIG. 4, the height of the supply port is ha, i.e., within the range of ha±α, thereby not resulting in an unfavorable machined result. Meanwhile, in (b) of FIG. 4, the height hb of the supply port has a relationship of hb>ha+α, that is, hb is out of the range of ha±α. In this case, the metal wire melted by irradiation with the machining light 30 does not sufficiently adhere to the product 4 that has already been formed, thereby causing a molten droplet 71 to be generated, and surface irregularities to be formed on the product 4 after the machining. Furthermore, in (c) of FIG. 4, the height hc of the supply port has a relationship of hc<ha−α, that is, hc is out of the range of ha±α. In this case, the metal wire is excessively pressed toward the product 4 having already been formed, and thereby the metal wire is not entirely molten even upon irradiation with the machining light 30, so that an unmelted portion 72 of the metal wire is caused. As a result, the product 4 after the machining adversely includes such an unmelted portion of the metal wire. In this situation, it is essential for high-precision machining to continue maintaining the height of the supply port dependent on the product 4 having already been formed, at a suitable value during machining.

For the first layer at the beginning of forming of the product 4 on the workpiece 3, the forming process is appropriately performed with maintaining the height of the supply port at a constant value as long as the height of the workpiece 3 is constant. However, the second and subsequent layers need to be formed on the product 4 having already been formed until the previous forming process (previous layer). In this regard, the height of the product 4 having been formed until the previous time may be unequal to the design value. In this case, even if the supply port is elevated by the height equivalent to one design layer with respect to the height of the supply port at the previous deposition, the height of the supply port may in fact be out of a suitable range for the supply port corresponding to the current deposition portion, for a part in which the height of the product 4 until the previous deposition differs from the design value. In addition, there is contemplated a case where the height of the product 4 is not constant depending on the position. Even if the height in the second layer process falls within the suitable height range (ha±α), in other words, within a tolerance range, performing of multiple machining processes may cause the height in the n-th layer (n≥2) process to exceed the tolerance range (ha±α) due to accumulation of n times of a deposition error. In this situation, the height of the product 4 after a forming process needs to be measured, and this measurement result needs to be used at the next forming process to provide optimum control. In addition, the height of the product 4 is desirably measured after the temperature of the product 4 lowers.

Next, description is given for a method for maintaining the metal wire at a suitable height with respect to the product 4 having already been formed, using the measured height of the product 4 having already been formed. After a forming process of the product 4, it is possible to scan the same path again for the measurement not for the machining, so as to measure the height of the product 4 having already been formed. However, in this case, it takes a lot of time since the machining path has to be subjected to scanning twice for additive manufacture per layer. In this regard, by measuring the height of the product 4 having already been formed during the machining, the number of times of scanning of the machining path for one layer of additive forming process can be just once, and both of the additive forming process and measurement of the height of the product 4 having already been formed can be performed.

Figure 5:
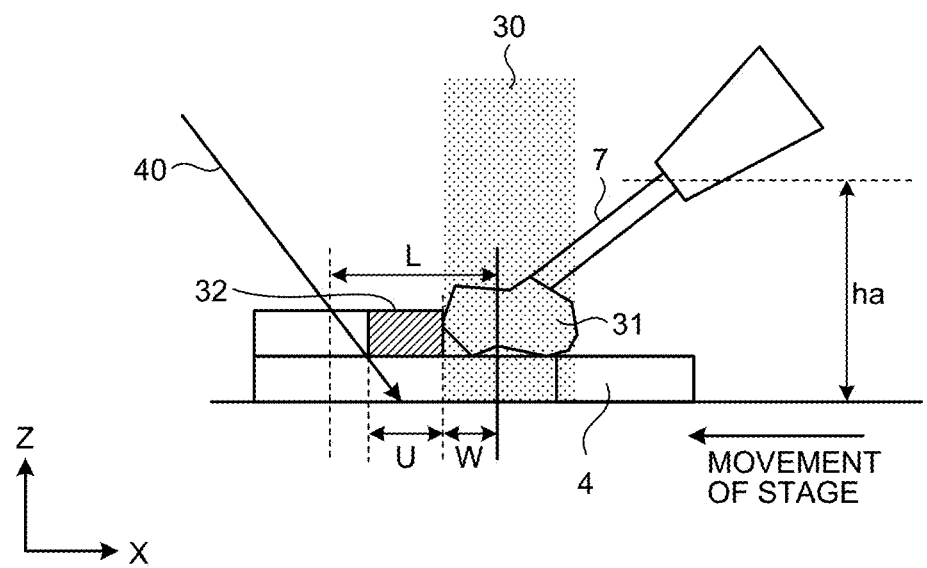
FIG. 5 is a diagram illustrating an X-Z cross section at a working point during manufacture according to the first embodiment.

FIG. 5 is a diagram illustrating an X-Z cross section at the working point during a machining process according to the first embodiment. FIG. 5 illustrates the case of performing machining such that the bead extends in the positive X-direction (the same direction as the wire). In FIG. 5, the height of the product 4 having already been formed is measured at a position that has moved in the negative X-direction with respect to the working point. As used herein, the region where the machining light 30 is applied to the working point during the additive forming process and the metal wire is in a molten state on the workpiece 3 is referred to as melt pool 31.

For example, when the driven stage 6 having the workpiece 3 placed thereon is subjected to scanning in the negative X-direction as illustrated in FIG. 5, the working point moves on the workpiece 3 in the positive X-direction, thereby enabling the product 4 having a linear shape to be formed to extend in the positive X-direction. A portion at the working point near the melt pool 31 has a high temperature. Then, moving the driven stage 6 in the negative X-direction causes the melt pool 31 to be naturally cooled, but causes a region where the metal has a high temperature, i.e., a high temperature portion 32, to appear behind (in the negative X-direction of) the melt pool 31 after a forming process. This high temperature portion then solidifies into a certain shape as a metal bead after a lapse of sufficient time. Accumulation of layers of this bead results in the product 4. The high temperature portion 32 appears in the negative X-direction that is an opposite direction to the direction in which the working point moves on the workpiece 3 with respect to the working point. In this regard, the direction in which the working point moves on the workpiece 3 means the direction along the travel path of the working point.

Assume here that an end of the melt pool 31 is situated away from the center of the working point (optical axis of the machining light 30) by a distance W, and the bead has high temperature, and that the high temperature portion 32 not yet sufficiently solidified is situated away from an end of the melt pool 31 by a distance U. The fabrication material 7 is melted in the melt pool 31, and so it is difficult to correctly measure the height of the product 4 having already been formed. In addition, due to the melt pool 31 having a high temperature enough to melt the fabrication material 7 such as a metal, a thermal radiation light having a very high brightness is caused, and this thermal radiation light interferes with the measurement. Therefore, the measurement position at which the height is measured is situated desirably away from the center of the working point by at least the distance W. That is, it is desirable that the measurement position does not overlap the melt pool 31.

In addition, the high temperature portion 32 is situated in a range of a distance of W+U from the center of the working point in the negative X-direction with respect to the working point. The bead has not yet completely solidified in the high temperature portion 32, and so an accurate measurement of the height is difficult. Therefore, when the height is to be measured at a position that has moved in the negative X-direction with respect to the working point, it is more desirable that an irradiation position L of the line beam 40 is a position away from the center of the working point by a distance of W+U or longer. That is, the measurement position in which the height is to be measured is more desirably set to a position out of the range in which the fabrication material 7 is in a molten state at the time of machining.

Figure 6:
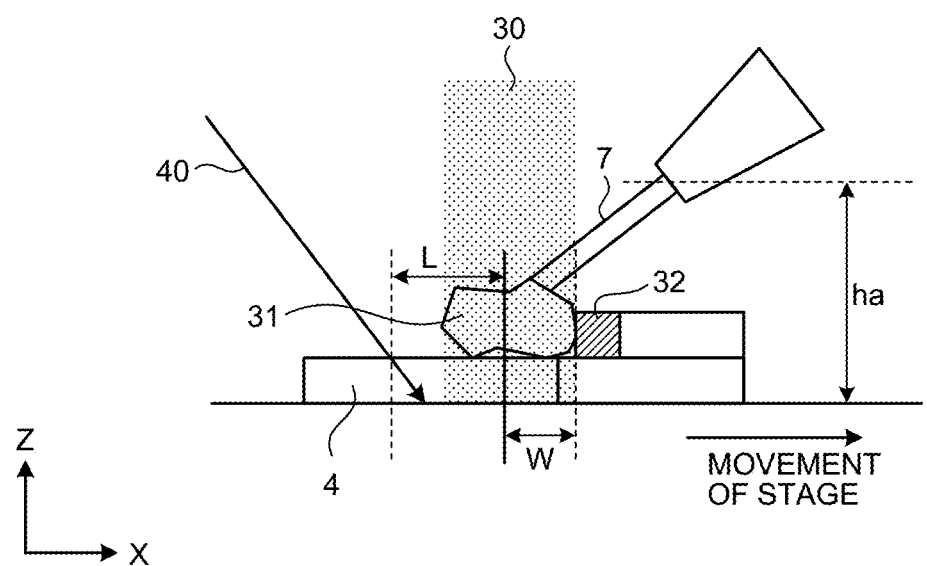
FIG. 6 is another diagram illustrating an X-Z cross section at a working point during manufacture according to the first embodiment.

FIG. 6 is another diagram illustrating an X-Z cross section at the working point during a machining process according to the first embodiment. FIG. 6 illustrates the case of machining such that the bead extends in the negative X-direction (the opposite direction to the wire). Also in FIG. 6, the height of the product 4 having already been formed is measured at a position that has moved in the negative X-direction with respect to the working point. By the driven stage 6 having the workpiece 3 placed thereon being subjected to the scanning in the positive X-direction as illustrated in FIG. 6, the working point moves on the workpiece 3 in the negative X-direction, thereby enabling the product 4 having a linear shape to be formed to extend in the negative X-direction. Also in this case, the high temperature portion 32 on the outer side of the melt pool 31 appears in a direction opposite to the direction in which the working point moves on the workpiece 3 with respect to the working point. In the case of FIG. 6, the working point moves on the workpiece 3 in the negative X-direction, and so the high temperature portion 32 on the outer side of the melt pool 31 appears in the positive X-direction with respect to the working point. On the contrary, the height of the product 4 having already been formed is measured at a position in the negative X-direction that is the same direction as the direction in which the working point moves on the workpiece 3 with respect to the working point. Because the high temperature portion 32 does not appear in the negative X-direction with respect to the working point, the measurement position just needs to circumvent only the melt pool 31. Thus, it is sufficient that an irradiation position L of the line beam 40 is a position distanced from the center of the working point by the distance W or longer.

As described above, by setting the measurement position of the height in the same direction as the direction in which the working point moves on the workpiece 3 with respect to the working point, that is, in the travel direction along the machining or forming path, the height can be measured at a position closer to the working point. In other words, when a position on a path in which the working point moves, in which the working point moves as time advances, the height can be measured at a position closer to the working point. Accordingly, it is more desirable to set the measurement position of the height in the direction in which the working point moves on the workpiece 3 when viewed from the working point, that is, in the travel direction along the machining path. As illustrated in FIG. 6, by setting the measurement position in a direction opposite to the direction in which the high temperature portion 32 appears with respect to the working point, the measurement can be performed without suffering from the effect of the bead becoming at a high temperature and in a molten state without solidification, and moreover, at a position closer to the working point. In the additive manufacturing apparatus 100 of the present embodiment, the line beam 40 is applied in the travel direction of the machining path with respect to the working point as illustrated in FIG. 6.

Even in a case of setting the measurement position in the same direction as the direction in which the high temperature portion 32 appears with respect to the working point as illustrated in FIG. 5, if an irradiation position of the line beam 40 is sufficiently far from the working point, the bead can solidify to a sufficient degree. Nevertheless, when the irradiation angle of the line beam 40 is fixed, installation positions of the line lighting device 8 and the light receiving optical system are both required to be situated away from the machining head 2, thereby leading to increase in size of the apparatus. Besides, it is necessary to determine the magnification of the light receiving optical system to make a visual field larger so that the line beam 40 comes within an imaging area of the light receiving unit 16, thereby leading to a problem in that resolution per pixel of the light receiving unit 16 lowers. Moreover, as a possibility, an integrated configuration of the machining head 2 and the line lighting device 8 may fail in performing the measurement. In a configuration as illustrated in FIG. 5 in which the driven stage 6 is subjected to scanning in the negative X-direction and the wire is supplied from a side in the positive X-direction, measurement along the travel direction (positive X-direction) of the machining path suffers interference from a wire supply part. However, in a case of no interference from the wire supply part using a method other than the method using the line beam 40, a configuration as illustrated in FIG. 5 may be used in which the driven stage 6 is subjected to scanning in the negative X-direction.

Figure 7:
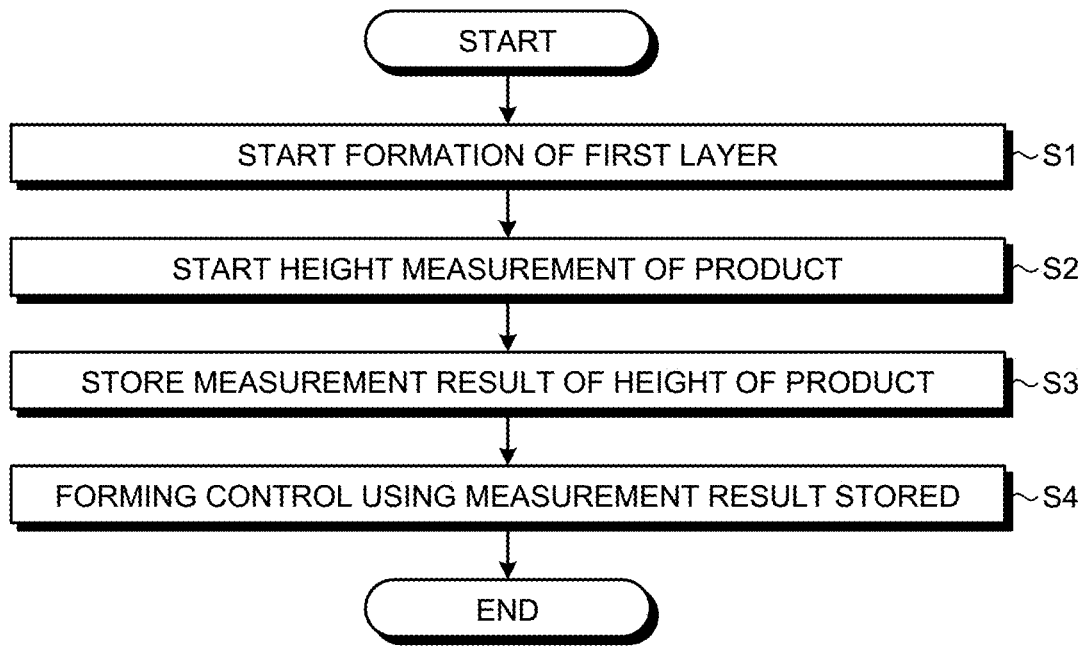
FIG. 7 is a flowchart illustrating a procedure of wire height control according to the first embodiment.

A procedure of wire height control will next be described. FIG. 7 is a flowchart illustrating a procedure of wire height control according to the first embodiment. The term "wire height" refers to the height of a leading end of the fabrication material 7 irradiated with the machining light 30, with respect to the top surface of the workpiece 3. Note that the wire height is the height of the leading end of the fabrication material 7 when the fabrication material 7 is in an unmelted state. First, an additive manufacturing process of the first layer is started (step S1). The flat base plate has no bead formed thereon at the measurement position at the time of the additive manufacturing process of the first layer, and thus height measurement is not needed. Meanwhile, in a case of deposition on the product 4, a case of use of a deformative base plate, or other cases like that, height measurement of the first layer is effective in order to perform accurate additive manufacture. At this point, measurement of the height of the product 4 is started along with the additive forming process of the first layer (step S2), and a measurement result of the height of the product 4 at the measurement position is stored (step S3). Then, in a case in which a next forming process is to be performed at the measured position of the product 4, forming control is performed using the measurement result stored at step S3 (step S4). In this operation, the interval of the height of the product 4 that is measurable is determined based on a frame rate of the image sensor used in the light receiving unit 16 as a light receiving element, and on a scanning speed of a machining axis (scanning speed of the working point). For example, assuming that the frame rate is F [fps] and the moving speed of the driven stage 6 is v [mm/s], the measurement interval Λ [mm] of the height of the product 4 in a scanning direction of the working point is Λ=v/F. Therefore, when "L" denotes a distance from the working point to the measurement point, a result of the measurement in the cycle before L/Λ times is a measurement result corresponding to the current working position. In fact, since the position of the stage at the working point is linked with the measurement position, the measurement result at the current working position can be looked up. That is, the height of a layered object on the (n−1)th layer at a certain measurement position is measured for forming of an n-th layer, and after L/Λ cycles from this measurement, use is made of the measurement result obtained by measurement performed for manufacture of the foregoing measurement position that is a working position, to perform optimum forming control. That is, the control unit 10 controls the forming or machining condition for newly depositing a layer at the measurement position in accordance with the measurement result.

Figure 8:
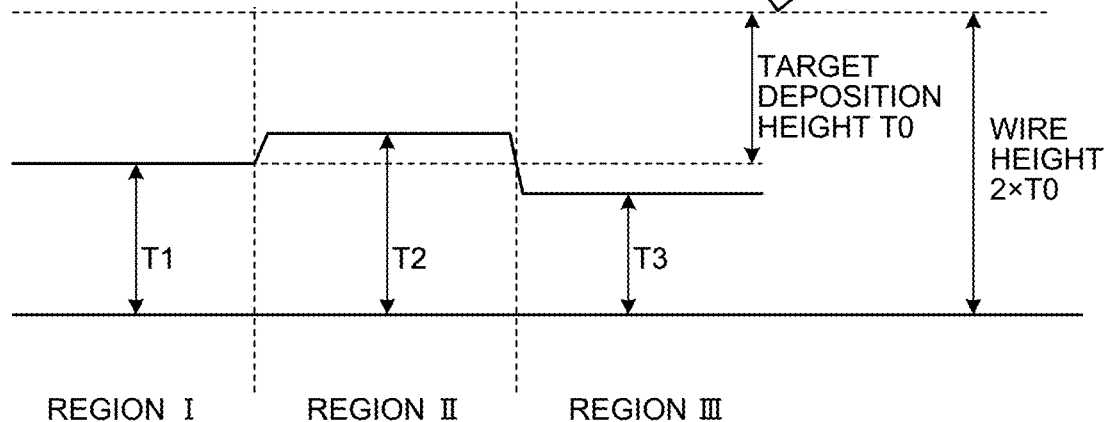
FIG. 8 is a diagram illustrating a wire height when the additive manufacturing apparatus according to the first embodiment forms a second layer.

FIG. 8 is a diagram illustrating the wire height when the additive manufacturing apparatus 100 according to the first embodiment forms a second layer. A method of forming control will now be described with reference to FIG. 8. Assume that the product 4 having been formed for the first layer has a height of T1 (=T0) as designed in a region I, where T0 is a target deposition height. In this example, the term "target deposition height" refers to a preset height of a layered object which is a newly deposited on the product 4. Also assume that the product 4 having been formed up to the first layer can have a height T2 (>T0) that is greater than the design value in a region II, and can have a height T3 (<T0) that is less than the design value in a region III. In this example, assuming that a wire height relative to the height of the product 4 having already been formed, such that the product 4 is formed with the target deposition height, is T0 that is equal to the target deposition height, the wire height just needs to be 2×T0 in order that the deposition height is 2×T0 in forming the second layer. For simplicity's sake, the following description is given based on the assumption that the wire height for forming the product 4 to have a target height is T0 that is equal to the target height of the product 4, but the former may differ from the latter in practice.

In forming of the second layer in the region I, no particular change needs to be made in the forming condition because the measurement result T1 on the second layer is the same as the target deposition height T0. Meanwhile, in forming of the region II, considering that the measured deposition height T2 is greater than the target deposition height T0, the amount of deposition for the second layer needs to be 2×T0−T2 to obtain the deposition height of 2×T0 of the second layer. Although examples of a machining parameter (machining condition) for changing the amount of deposition may include various parameters such as the machining laser output, the wire feed speed, and the stage feed speed, a case of controlling the wire feed speed will herein be described. In the case of forming the region II, an amount of deposition needs to be less than the design value, and therefore, control is performed to reduce the wire feed speed thereby to reduce the supply amount of the metal material so that the total amount of deposition of both the first layer and the second layer is 2×T0. Similarly, in the case of forming the region III, considering that the measured deposition height T3 measured is less than the target deposition height T0, the amount of deposition for the second layer needs to be T0−T3 2×T0−T3. Accordingly, control is provided to increase the wire feed speed thereby to increase the supply amount of the metal material so that the total amount of deposition of both the first layer and the second layer is 2×T0. That is, the machining condition is controlled by the control unit 10 depending on the difference between a preset height of a layered or deposited object newly deposited on the product 4 and the measurement result.

As described above, use of the result of measurement of the deposition height for the (n−1)th layer measured immediately before an n-th layer is formed, to optimally control the machining condition enables the deposition height with respect to the target wire to be constantly maintained within a range of ha±α as illustrated in FIG. 4. Thus, the forming process can be continued without occurrence of forming failure. The above example has been described in the context of changing the wire feed speed to perform forming control, but another parameter or multiple parameters may be changed to perform forming control. For example, in order to use a smaller amount of deposition, there is contemplated a manner such that the laser output is lowered and/or the stage speed is increased. In addition, in a case in which the average height of the (n−2)th layer before forming the n-th layer significantly differs from the target deposition height T0, there is contemplate a manner such that the amount of change in the height of the wire to be raised for forming the n-th layer after completion of forming the n−1)th layer is determined to be the average of the height measured for the (n−2)th layer for T0 that is the design value, and the measurement result for the (n−1)th layer is used during formation of the n-th layer so as to perform optimum forming control. In addition, in a case in which the measurement results of the height of the product 4 differ from one other between the regions among the region I of the n-th layer, the region II of the n-th layer, and the region III of the n-th layer as illustrated in FIG. 8, the amount of change in the height of the wire to be raised may be changed for each region.

Figure 9:
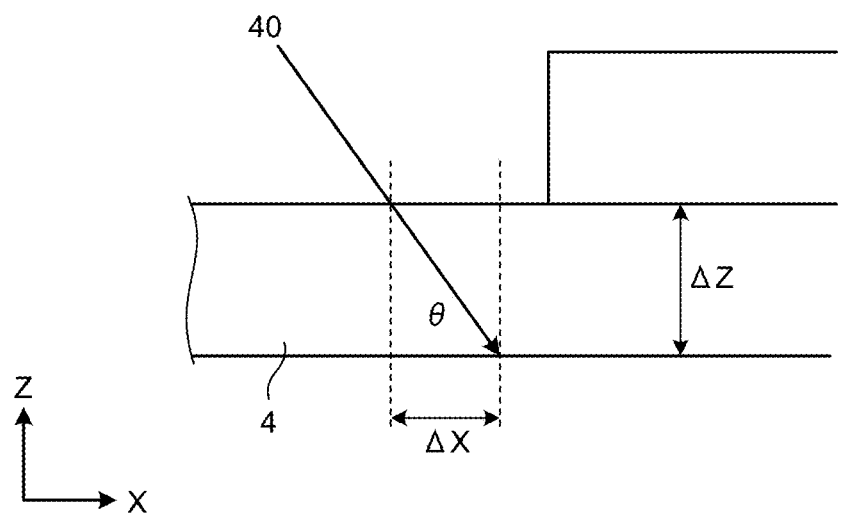
FIG. 9 is a diagram illustrating an enlarged X-Z cross section of the product irradiated by a line lighting device according to the first embodiment.
Figure 10:
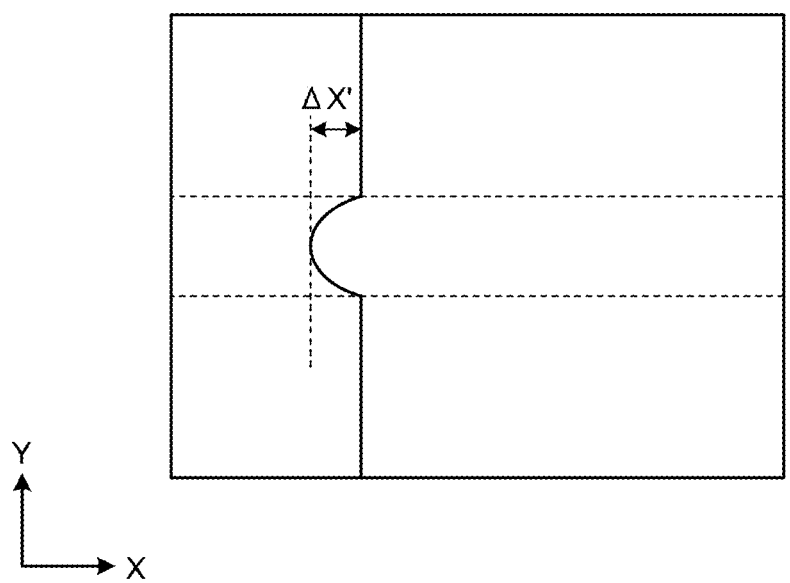
FIG. 10 is a diagram illustrating an image of a line beam imaged on a light receiving element when the line beam is applied to the product according to the first embodiment.

A height measurement operation using a light section method for measurement of the bead height after a forming process will next be described. FIG. 9 is a diagram illustrating an enlarged X-Z cross section of the product 4 irradiated by the line lighting device 8 according to the first embodiment. When $\Delta Z$ denotes the height of the product 4 relative to the top surface of the workpiece 3, and θ denotes the irradiation angle of the line beam 40, a difference $\Delta X$ between the position irradiated with the line beam 40 on the top surface of the workpiece 3 and the position irradiated with the line beam 40 on the product 4 is expressed as $\Delta X = \Delta Z/\tan \theta$. FIG. 10 is a diagram illustrating an image of the line beam 40 imaged on the light receiving element when the line beam 40 is applied onto the product 4 according to the first embodiment. Due to the difference between the height of the product 4 and the height of the workpiece 3, the irradiation position of the line beam 40 is projected with being deviated by $\Delta X'$. Use of a magnification M of the light receiving optical system yields a relationship of $\Delta X' = M \times \Delta X$. When "P" denotes the size of one pixel of the image sensor, the amount $\Delta Z'$ of change in the height per pixel is expressed as $\Delta Z' = P \times \tan \theta / M$. For example, a value set of P=5.5 μm, M=½, and θ=72 degrees results in $\Delta Z'$=33.8 μm. As described above, the distance from the sensor to the target object can be computed from the projected position of the line beam 40 on the image sensor image based on the principle of triangulation. In addition, the height of the product 4 can be computed from the difference between the positions irradiated with the line beam 40 on the top surface of the workpiece 3 and on the top surface of the product 4. Even when the height of the product 4 becomes higher than the top surface of the workpiece 3, and the reflected light of the line beam 40 from the top surface of the workpiece 3 cannot be received, the distance from the sensor can be computed using the position irradiated with the line beam 40 reflected at the top surface of the product 4 within the visual field on the light receiving element.

The position irradiated with the line beam 40 is generally computed from the center-of-gravity position in the X-direction on the projection pattern of the line beam 40. The X-directional output is computed for each Y-directional pixel, and the center-of-gravity position is then computed from the cross-sectional intensity distribution of the line beam 40. Note that the position irradiated with the line beam 40 may also be appropriately selected and computed from the peak position of light intensity or the like, not only from the center-of-gravity position. The line beam 40 needs to have an irradiation width sufficiently large for computation of the irradiated position. For example, in the case of center-of-gravity computation, an excessively small irradiation width results in a failure in center-of-gravity computation, whereas an excessively large irradiation width easily causes an error due to an effect of variation in the beam intensity pattern. For this reason, about 5 to 10 pixels are desirable. In addition, the line length of the line beam 40 (irradiation width of the line beam 40) only needs to be sufficiently longer than the width of the product 4. As described above, the center-of-gravity position of brightness in the X-direction is computed for each pixel in the Y-direction of the image, and the result thereof is then converted into the height, thereby making it possible to measure the cross-sectional distribution in the height of the product 4 along the widthwise direction of the product 4. In a case of use of a spot beam as the illumination light for use in measurement of the height of the product 4, the cross-sectional distribution in the height of the product 4 cannot be measured, but a suitable selection of the spot size enables less erroneous measurement to be performed.

The foregoing description has been presented in the context of the method of computing the height of the product 4 based on the line beam 40 in the state of no forming process but when measurement is made in the process of forming, the working point becomes a highly bright light emitting point, and an image of the melt pool 31 appears in the image center. In this situation, installing the band-pass filter 14 within the light receiving optical system and increasing the output of the line lighting device 8 to a sufficient level enables the height to be measured based on the line beam 40 without suffering from an effect of light emission in the melt pool 31.

Figure 11:
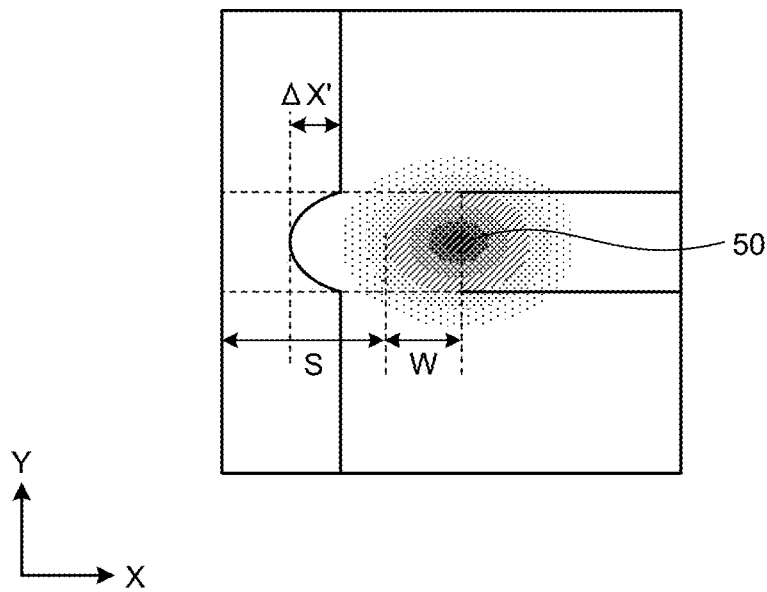
FIG. 11 is a schematic diagram illustrating a result of imaging by an image sensor that is a light receiving element during manufacture according to the first embodiment.

FIG. 11 is a schematic diagram illustrating a result of imaging by the image sensor that is a light receiving element in the process of forming according to the first embodiment. As described above, because the position irradiated with the line beam 40 is made apart from the melt pool 31, a thermal radiation light outputted from a working point 50 and the reflected light of the line beam 40 can be separated from each other. If the measurement position is set in the high temperature portion 32, the bead is not yet completely solidified but is still in a liquid state, thereby possibly leading to failure in measurement of the illuminance distribution on the bead for the reason of insufficient reflection of the line beam 40. Even if the measurement can be successfully made, different melting states are caused depending on the measurement positions, thereby resulting in a measurement error in the height of the bead with respect to the measurement position. Moreover, an error would also occur due to thermal shrinkage of metal in the solidified state relative to metal in the molten state. In contrast, the additive manufacturing apparatus 100 of the present embodiment makes measurement regarding the moving direction of the working point 50 for the working point 50, and therefore can make measurement of the height of the deposition object with high accuracy by making the measurement position apart from an end of the melt pool so as to avoid suffering from an effect of melting of the bead in the high temperature portion 32.

When "D" denotes a height range of heights to be measured, the amount S of movement of the line beam 40 with respect to the distance D can be expressed as $S = D \times M/\tan \theta$. Therefore, the light receiving optical system is desirably designed to have, as a minimum requirement, a visual field of W+S, where W is the distance from the image center to the end of the melt pool. In this way, the additive manufacturing apparatus 100 of the present embodiment can maintain a target height of the layered object by measuring the bead height at a point in the travel direction of the additive forming process in the process of manufacture, and performing control to make a machining condition suitable in the next machining process. In addition, the additive manufacturing apparatus 100 of the present embodiment can maintain the height between the wire supply port and the layered object at a constant value, thereby achieving high-accuracy additive manufacture. Thus, the additive manufacturing apparatus 100 can prevent a reduction in accuracy in forming the product 4. Moreover, the additive manufacturing apparatus 100 of the present embodiment can measure the height of the bead at a position close to the working point 50, thereby enabling the height sensor to be integrated with the machining head 2, and in turn enabling size reduction of the apparatus.

The above example has been described in the context of the configuration that provides size reduction of the apparatus by integration of the height sensor with the machining head 2. However, the height sensor does not necessarily need to be integrated with the machining head 2 in a strict sense. It is needless to say that an arrangement in which the height sensor is disposed separately from the machining head 2, and measures the height of the layered object at a point near the working point 50 can also exert a similar advantageous effect. In this regard, since the height sensor according to the present invention uses the line beam 40 to perform height measurement, the condenser lens 15 not for use in the combination of forming and height measurement is preferably of an optical system that allows only the line beam 40 to be focused onto the light receiving unit 16.

Figure 12:
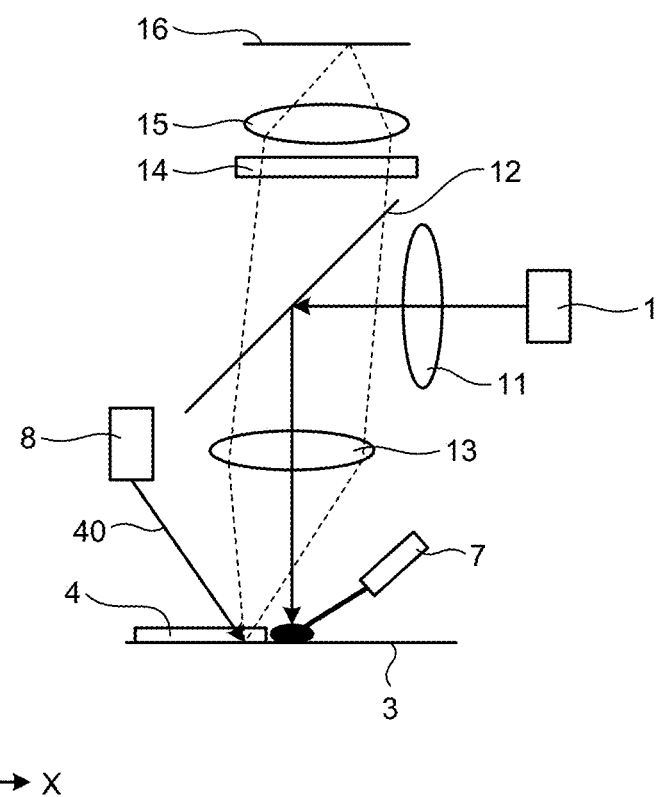
FIG. 12 is another view illustrating a cross section in an X-Z plane of FIG. 1.

FIG. 12 is another view illustrating a cross section in the X-Z plane of FIG. 1. For example, as illustrated in FIG. 12, the center axis of the objective lens 13 and the center axis of the condenser lens 15 may be arranged out of alignment in a direction perpendicular to the center axis of the objective lens 13. In this example, the objective lens 13 is a lens that focuses the machining light 30 onto the working position. Therefore, in the configuration of FIG. 12, the position of the center axis of the optical system for focusing the reflected light transmitted through the objective lens 13 onto the light receiving unit 16 does not coincide with the position of the center axis of the objective lens 13 for focusing the machining light 30 onto the working position. Use of such a configuration enables the reflected light of the line beam 40, which is illumination light for the measurement, to be focused onto the light receiving element with a minimum effect of aberration of the lens, and can thus increase accuracy of height measurement.

A similar advantageous effect can be obtained, instead of configuring the positions of the center axes in an out-of-alignment arrangement as described above, with a configuration in which the center axis of a third focusing optical system that focuses the reflected light having passed through the objective lens 13 onto the light receiving unit 16 is tilted with respect to the center axis of the objective lens 13 that condenses the machining light 30 onto the working position. In addition, the lens surface of the condenser lens 15 may be changed in shape. Moreover, what is required for the visual field of the light receiving unit 16 is just to be broader than a range of movement of the line beam 40 within the range of height measurement, and use of a focusing system for enlarging only the range of movement of the line beam 40 enables the resolution of the line beam 40 to be increased, and can thus improve accuracy of height measurement.

Second Embodiment

The additive manufacturing apparatus 100 according to a second embodiment is configured similarly to that in the first embodiment, but the line beam for use in the height measurement has a different shape. The additive manufacturing apparatus 100 according to the second embodiment provides the line beam 40 having an irradiation shape that is not linear, but is a circular shape about the working point 50. By such use of a circular irradiation shape for the line beam 40, even if a formed shape is not linear and a scanning direction of the working point varies in the process of forming, the line lighting device 8 can apply light to the product 4 at a right angle to the product 4 (in the widthwise direction of the product 4) crosswise. This can eliminate any rotation mechanism for a scanning stage, and can thus reduce the size of the apparatus. For example, rotation of the driven stage 6 in the X-Y plane enables the measurement position to be situated on the front side of the working point 50 even when the scanning is to be performed obliquely relative to the X-axis and to the Y-axis. Meanwhile, use of a circular irradiation shape for the line beam 40 enables at least some of the measurement positions to be situated on the front side of the working point 50 without rotating the driven stage 6.

Figure 13:
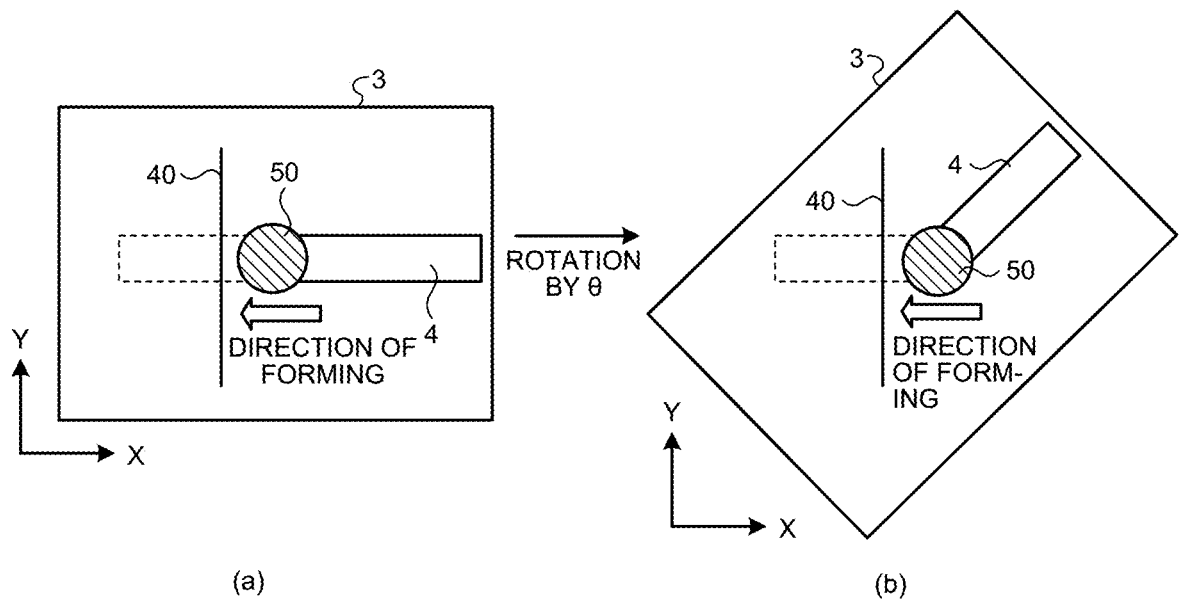
FIG. 13 is a first view illustrating an X-Y cross section in a case of performing manufacture in which the direction of forming of the product according to a second embodiment is changed.

FIG. 13 is a first view illustrating an X-Y cross section in a case of performing machining while changing the direction of forming of the product 4 according to the second embodiment. Note that a dotted area each in FIG. 13 and the subsequent figures represents an area where deposition is to be made by the additive manufacturing apparatus 100. As illustrated in (a) of FIG. 13, in a case of performing machining with the direction of forming of the product 4 being changed using a rotation stage, the workpiece 3 can be rotated by an angle of θ for forming the workpiece 3 as illustrated in (b) of FIG. 13 using a rotation stage for the X-Y plane on the driven stage 6. Therefore, the machining direction is always constant. In this case, even if the line beam 40 having a linear shape is used, it is possible to constantly apply the line beam 40 perpendicularly to the direction of machining of the product 4.

Figure 14:
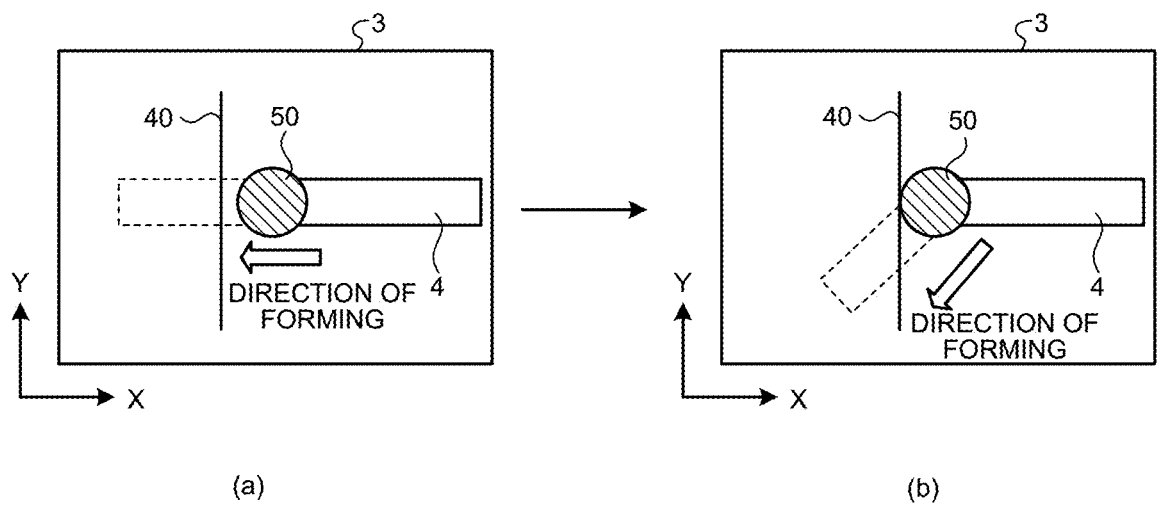
FIG. 14 is a second view illustrating an X-Y cross section in a case of performing manufacture in which the direction of forming of the product according to the second embodiment is changed.

FIG. 14 is a second view illustrating an X-Y cross section in a case of performing machining while changing the direction of forming of the product 4 according to the second embodiment. As illustrated in (a) of FIG. 14, in a case of performing machining while changing the direction of forming of the product 4 without using a rotation stage, the machining direction can be changed by controlling the moving speed in the X-axis direction and the moving speed in the Y-axis direction at a suitable ratio therebetween, but the machining needs to be performed obliquely to the X-Y plane. In this regard, if the line beam 40 having a linear shape is used, measurement cannot be made along a cross section perpendicular to the direction in which deposition is made such that the product 4 extends, in a case of performing machining in the oblique direction as illustrated in (b) of FIG. 14.

Figure 15:
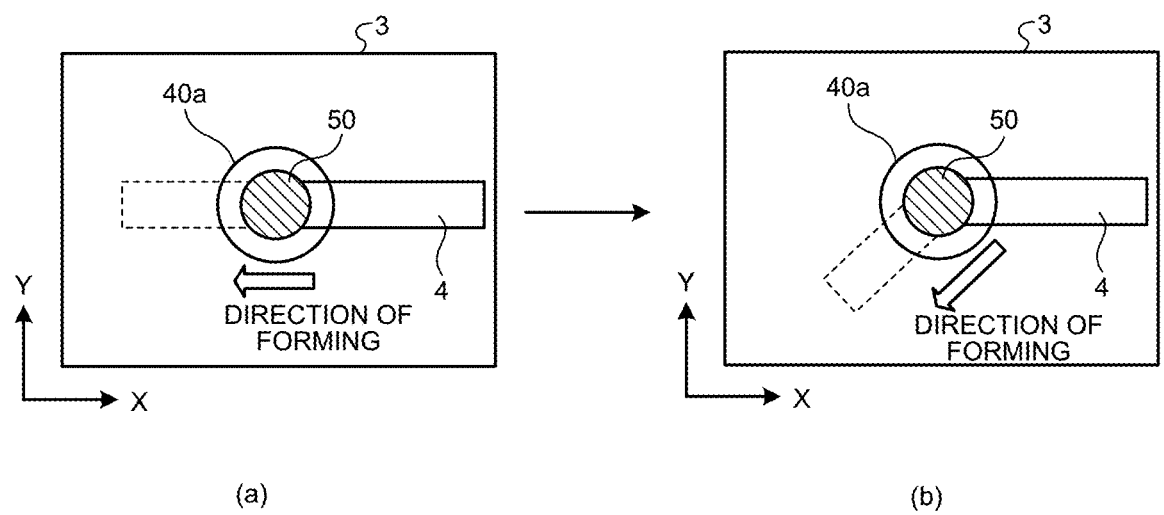
FIG. 15 is a third view illustrating an X-Y cross section in a case of performing manufacture in which the direction of forming of the product according to the second embodiment is changed.

FIG. 15 is a third view illustrating an X-Y cross section in a case of performing machining while changing the direction of forming of the product 4 according to the second embodiment. As illustrated in (a) of FIG. 15, the line lighting device 8 uses a line beam 40a having a circular shape. In this case, as illustrated in (b) of FIG. 15, even if the product 4 is to be formed in the oblique direction, the line beam 40a is applied with a circular shape about the working point 50, and thereby the height of the product 4 can be measured always at a constant distance from the working point 50 irrespective of the machining direction. The additive manufacturing apparatus 100 of the present embodiment measures the height using an irradiation region of the front side of the moving direction of the working point 50 on the workpiece in the movement direction 3 with respect to the working point 50, of the irradiation area irradiated with the line beam 40a in a circular shape.

The reflected light is focused onto the light receiving unit 16 from the entire circumference of the irradiation area having a circular shape. The additive manufacturing apparatus 100 of the present embodiment measures the height using the image of the reflected light from an arc portion on the front side of the working point 50 in the moving direction of the working point 50, of the entire circumference. In a case of feeding the wire from a side in the positive X-direction, machining is often performed, in general, in a 180-degree range from the positive Y-direction through the negative X-direction toward the negative Y-direction. For this reason, although the line beam 40a having a circular shape has been described herein, a strictly circular shape is not necessarily required therefor, and so the beam may have an ellipse-like shape, and a partially removed shape such as a semicircle may also be acceptable. As long as the amount of change in the direction of extension of the line of a line beam of 90 degrees or more, measurement of the height of the product 4 having already been formed can be realized, no matter in which direction the working point 50 is subject to scanning. For example, in a case of use of the line beam 40a having an arc shape, the acceptable central angle is 90 degrees or higher. In a case of use of a line beam having a 90-degree arc shape ranging from the negative X-direction to the positive Y-direction, measurement is made immediately after a machining process when the bead is formed to extend in the positive X-direction and the negative Y-direction, whereas measurement is made immediately before a forming process when the bead is formed to extend in the negative X-direction and the positive Y-direction. In addition, in a case of use of a line beam having a curved shape, the amount of change in the tangential direction just needs to be 90 degrees or more. Moreover, when machining is performed only in two directions perpendicular to each other, a quadrangular shape such as a square may be used.

The configurations described in the foregoing embodiments are merely examples of contents of the present invention, can each be combined with other publicly known techniques and partially omitted and/or modified without departing from the scope of the present invention.

REFERENCE SIGNS LIST 1 machining laser; 2 machining head; 3 workpiece; 4 product; 5 fixture; 6 driven stage; 7 fabrication material; 8 line lighting device; 9 computing unit; 10 control unit; 11 floodlight lens; 12 beam splitter; 13 objective lens; 14 band-pass filter; 15 condenser lens; 16 light receiving unit; 20 lower limit value; 21 upper limit value; 30 machining light; 31 melt pool; 32 high temperature portion; 40, 40a line beam; 50 working point; 71 molten droplet; 72 unmelted portion; 100 additive manufacturing apparatus; 200 control circuit; 200a processor; 200b memory.

The invention claimed is:

1. An additive manufacturing apparatus that performs an additive manufacturing process by supplying a fabrication material to a working position, melting the fabrication material, and depositing a fabrication material solidified after melting at the working position, while moving the working position of a workpiece, and forms a manufactured product by repeating the additive manufacturing process, the additive manufacturing apparatus comprising:
a height measurement circuit to perform measurement of a height of the manufactured product having already been formed on the workpiece at a measurement position during the additive manufacturing process, and output a measurement result representing a result of the measurement; and
a controller to control a machining condition to be used when new deposition is made at the measurement position, in accordance with the measurement result,
wherein the measurement position is moved according to movement of the working position and leads or trails the working position as the working position is moved, the measurement position being a position where the fabrication material has solidified, wherein
the height measurement circuit includes:
a measurement lighting device to apply illumination light for measurement to the measurement position; and
a light receiving optical system to receive reflected light of the illumination light for measurement on a light receiving element, the reflected light being reflected from the measurement position, and
the height measurement circuit computes the height of the manufactured product formed on the workpiece on the basis of a light reception position of the reflected light on the light receiving element.

2. The additive manufacturing apparatus according to claim 1, wherein the measurement position is situated on a side in a direction in which the working position moves on the workpiece when viewed from the working position.

3. The additive manufacturing apparatus according to claim 1, wherein the controller reduces a supply amount of the fabrication material to be supplied to the working position in a case in which the measurement result is greater than a target value that is a preset height of a layered product, and increases the supply amount in a case in which the measurement result is less than the target value.

4. The additive manufacturing apparatus according to claim 1, wherein the controller increases a speed of moving the working position in a case in which the measurement result is greater than a target value that is a preset height of a layered product, and reduces the speed of moving the working position in a case in which the measurement result is less than the target value.

5. The additive manufacturing apparatus according to claim 1, wherein the controller raises a height of a leading end of the fabrication material before melting according to a target value that is a preset height of a layered product, increases an amount of raising the height before melting in a case in which the measurement result is greater than the target value, and reduces the amount of raising the height before melting in a case in which the measurement result is less than the target value.

6. An additive manufacturing apparatus that performs an additive manufacturing process by supplying a fabrication material to a working position, melting the fabrication material, and depositing a fabrication material solidified after melting at the working position, while moving the working position of a workpiece, and forms a manufactured product by repeating the additive manufacturing process, the additive manufacturing apparatus comprising:
a height measurement circuit to output a measurement result representing a height of the manufactured product having already been formed on the workpiece, at a measurement position; and
a controller to control a machining condition to be used when new deposition is made at the measurement position, in accordance with the measurement result,
wherein the measurement position is moved according to movement of the working position, and is a position where the fabrication material has solidified, the measurement position being situated on a side in a direction in which the working position moves on the workpiece when viewed from the working position, and the measurement position leads or trails the working position in a moving direction of the working position, wherein
the height measurement circuit includes:
- a measurement lighting device to apply illumination light for measurement to the measurement position; and
- a light receiving optical system to receive reflected light of the illumination light for measurement on a light receiving element, the reflected light being reflected from the measurement position, and the height measurement circuit computes the height of the manufactured product formed on the workpiece on the basis of a light reception position of the reflected light on the light receiving element.

7. An additive manufacturing apparatus that performs an additive manufacturing process by supplying a fabrication material to a working position, melting the fabrication material, and depositing a fabrication material solidified after melting at the working position, while moving the working position of a workpiece, and forms a manufactured product by repeating the additive manufacturing process, the additive manufacturing apparatus comprising:
- a height measurement circuit to output a measurement result representing a height of the manufactured product having already been formed on the workpiece, at a measurement position; and
- a controller to control a machining condition to be used when new deposition is made at the measurement position, in accordance with the measurement result, wherein the measurement position is moved according to movement of the working position, and is a position where the fabrication material has solidified,
the height measurement circuit includes:
- a measurement lighting device to apply illumination light for measurement to the measurement position; and
- a light receiving optical system to receive reflected light of the illumination light for measurement on a light receiving element, the reflected light being reflected from the measurement position, and the height measurement circuit computes the height of the manufactured product formed on the workpiece on the basis of a light reception position of the reflected light on the light receiving element.

8. The additive manufacturing apparatus according to claim 7, wherein the measurement position is situated on a side in a direction in which the working position moves on the workpiece when viewed from the working position.

9. The additive manufacturing apparatus according to claim 7, comprising:
- a machining optical system to focus machining light for melting the fabrication material onto the working position.

10. The additive manufacturing apparatus according to claim 9, wherein the light receiving optical system is integrated with the machining optical system.

11. The additive manufacturing apparatus according to claim 9, wherein the measurement position is within a visual field of the light receiving element.

12. The additive manufacturing apparatus according to claim 9, wherein the illumination light for measurement is a line beam applied in shape of a line.

13. The additive manufacturing apparatus according to claim 9, wherein the illumination light for measurement is a line beam applied in shape of a circle.

14. The additive manufacturing apparatus according to claim 12, wherein an amount of change of the line beam in a direction in which a line of the line beam extends is greater than or equal to 90 degrees.

15. The additive manufacturing apparatus according to claim 7, wherein the controller reduces a supply amount of the fabrication material to be supplied to the working position in a case in which the measurement result is greater than a target value that is a preset height of a layered product, and increases the supply amount in a case in which the measurement result is less than the target value.

16. The additive manufacturing apparatus according to claim 9, wherein the controller reduces an output of the machining light in a case in which the measurement result is greater than a target value that is a preset height of a layered product, and increases the output of the machining light in a case in which the measurement result is less than the target value.

17. The additive manufacturing apparatus according to claim 7, wherein the controller increases a speed of moving the working position in a case in which the measurement result is greater than a target value that is a preset height of a layered product, and reduces the speed of moving the working position in a case in which the measurement result is less than the target value.

18. The additive manufacturing apparatus according to claim 7, wherein the controller raises a height of a leading end of the fabrication material before melting according to a target value that is a preset height of a layered product, increases an amount of raising the height before melting in a case in which the measurement result is greater than the target value, and reduces the amount of raising the height before melting in a case in which the measurement result is less than the target value.

19. The additive manufacturing apparatus according to claim 9, wherein a wavelength of the illumination light differs from a wavelength of the machining light.

20. An additive manufacturing apparatus that performs an additive manufacturing process by supplying a fabrication material to a working position, melting the fabrication material, and depositing a fabrication material solidified after melting at the working position, while moving the working position of a workpiece, and forms a manufactured product by repeating the additive manufacturing process, the additive manufacturing apparatus comprising:
- a height measurement circuit to perform measurement of a height of the manufactured product having already been formed on the workpiece at a measurement position during the additive manufacturing process, and output a measurement result representing a result of the measurement; and
- a controller to control a machining condition to be used when new deposition is made at the measurement position, in accordance with the measurement result,
wherein the measurement position is moved according to movement of the working position, and is a position where the measurement position is situated away from the working position, and the fabrication material has solidified, the position being out of the range in which the fabrication material is in a molten state.

21. An additive manufacturing apparatus that performs an additive manufacturing process by supplying a fabrication material to a working position, melting the fabrication material, and depositing a fabrication material solidified after melting at the working position, while moving the working position of a workpiece, and forms a manufactured product by repeating the additive manufacturing process, the additive manufacturing apparatus comprising:

a height measurement circuit to output a measurement result representing a height of the manufactured product having already been formed on the workpiece, at a measurement position; and a controller to control a machining condition to be used when new deposition is made at the measurement position, in accordance with the measurement result, wherein the measurement position is moved according to movement of the working position, and is a position where the measurement position is situated away from the working position, and the fabrication material has solidified, the position being out of the range in which the fabrication material is in a molten state, the measurement position being situated on a side in a direction in which the working position moves on the workpiece when viewed from the working position.

\* \* \* \* \*